United States Patent [19]

Crosby, Jr.

[11] 4,280,674
[45] Jul. 28, 1981

[54] BALLOON WITH DEFLATION PORT
[75] Inventor: Edward L. Crosby, Jr., West Melbourne, Fla.
[73] Assignee: RCA Corporation, New York, N.Y.
[21] Appl. No.: 71,390
[22] Filed: Aug. 30, 1979
[51] Int. Cl.³ .............................................. B64B 1/62
[52] U.S. Cl. ......................................... 244/99; 244/31
[58] Field of Search ...................... 244/30, 31, 96, 97, 244/98, 99

[56] References Cited
U.S. PATENT DOCUMENTS

| 3,860,201 | 1/1975 | Hall ...................................... 244/99 |
| 4,033,527 | 7/1977 | Parsons ................................. 244/99 |

FOREIGN PATENT DOCUMENTS

| 4768 | of 1911 | United Kingdom ........................ 244/99 |
| 4525 | 1/1916 | United Kingdom ........................ 244/99 |
| 127633 | 6/1919 | United Kingdom ........................ 244/99 |
| 127637 | 6/1919 | United Kingdom ........................ 244/99 |

Primary Examiner—Charles E. Frankfort
Attorney, Agent, or Firm—Samuel Cohen; Carl V. Olson

[57] ABSTRACT

A balloon or airship having a hull of flexible material is provided with a deflation opening in the hull and a rigid frame permanently fastened to the edge of the opening. A ring of flexible sheet material has its peripheral edge removably clamped to the rigid frame. A disc of flexible sheet material larger than the central opening in the ring is fastened by an adhesive to the ring all around the central opening in the ring. A deflation tape sewed to the disc near the edge of the upper half thereof has a central free end to be pulled for peeling the adhesive-held disc from the ring to rapidly deflate the balloon.

9 Claims, 4 Drawing Figures

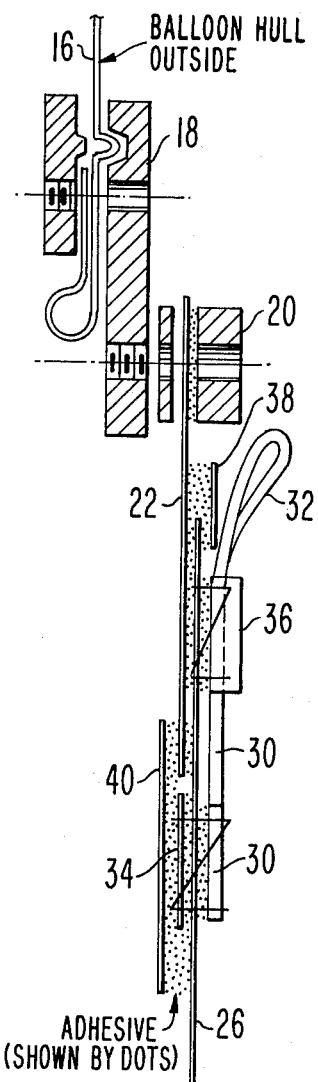
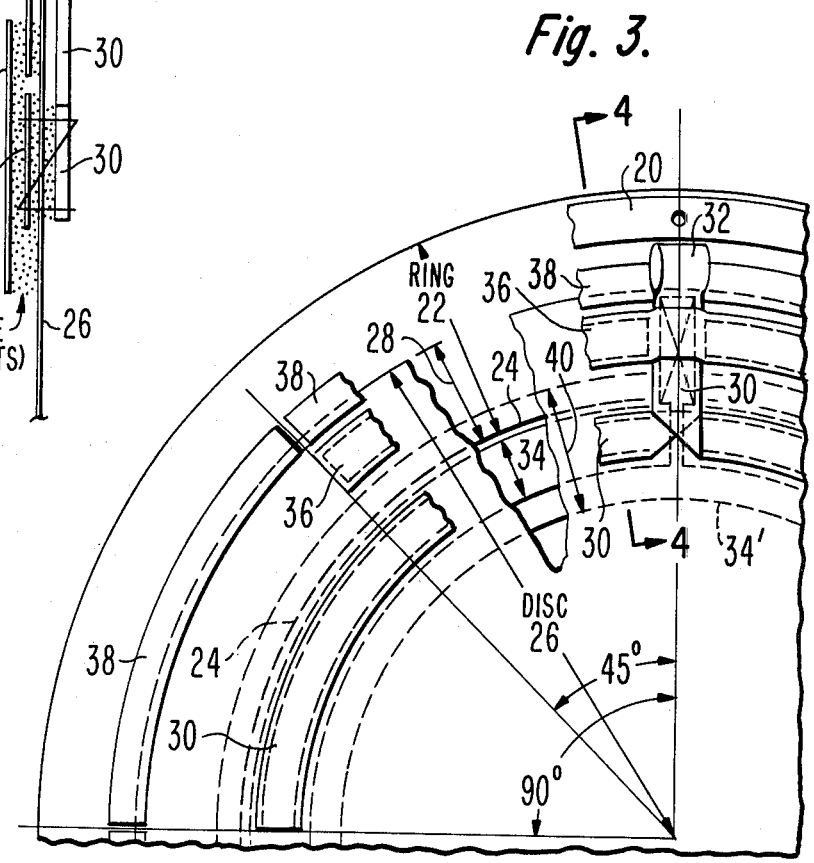

BALLOON WITH DEFLATION PORT

This invention relates to balloons and airships which are lifted by hot air or a lighter-than-air gas, and which are provided with a deflation port for rapidly collapsing the balloon after landing, or in case of an emergency such as the breaking away of the balloon from its mooring.

It is known according to the prior art to accomplish rapid deflation by a construction including of a number of holes in the balloon or airship hull, arranged in a vertical row, reinforced with sewn-in cords at their edges, and covered with a large single vertical piece of coated fabric called a rip panel which is cemented-down at the edges. An extension of this rip panel at the top is left unattached and is provided with a lanyard, in turn connected to ground tackle. In operation, should the vehicle break away, the lanyard, pulling on the top of the cloth panel, rips the cloth downward along two parallel paths so as to uncover the row of cord-bound holes, thereby venting gas and "downing" the balloon or airship. In order to return the vehicle to flight condition, the remains of the rip panel must be removed (a very laborious operation) and a new rip panel cemented in place. This is also a major job since such rip panels are large, typically 1.5 ft.×20 ft. in the case of a 200,000 cu. ft. balloon, with one rip panel on each side of the balloon. The known construction is also less than satisfactory in the integrity of the gas-tight seal over substantial periods of time, and the predictability of the force necessary to rip the cloth of the rip panel to expose the deflation holes in the balloon or airship hull.

In accordance with an example of the present invention, a balloon having an envelope of flexible material is provided with a deflation opening in the flexible envelope and a rigid frame permanently fastened to the edge of the opening. A ring of flexible sheet material has its peripheral edge removably clamped to the rigid frame, and has a central opening. A disc of flexible sheet material larger than the central opening is fastened by an adhesive to the ring all around the central opening in the ring. A deflation tape is sewed to the disc near the edge of the upper half thereof, and has a central free end to be pulled for peeling the adhesive-held disc from the ring to deflate the balloon.

In the drawing:

FIG. 3 is a fragmentary view of the deflation port of FIG. 2 with portions broken away to show interior details; and FIG. 4 is a sectional view taken along the line 4—4 of FIG. 3.

Figure 1:
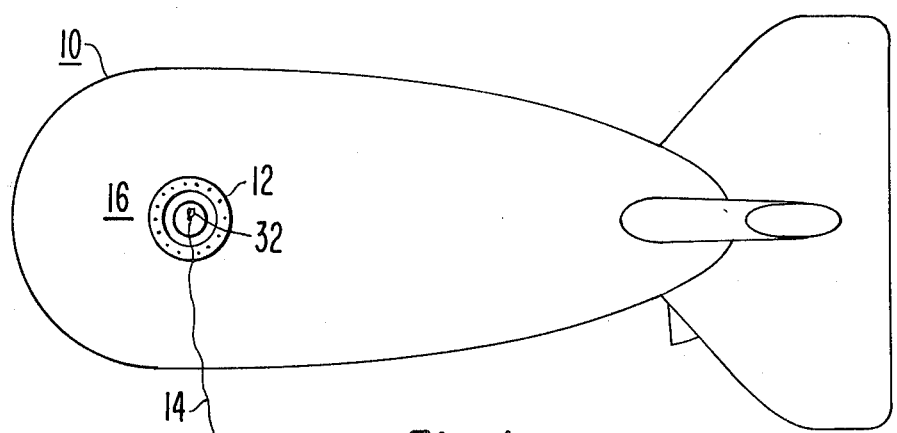
FIG. 1 is a elevation of an airship having a deflation port.

FIG. 1 shows a balloon or airship 10 which may, according to an actual example, be an aerostat having a hull made of a usual hull fabric and having a maximum diameter of 60 feet. The hull is provided with at least one deflation port 12, which may have a diameter of about 24 inches, and which can be opened for the release of gas from the hull by a pull of about 100 pounds on a lanyard 14.

Figure 2:
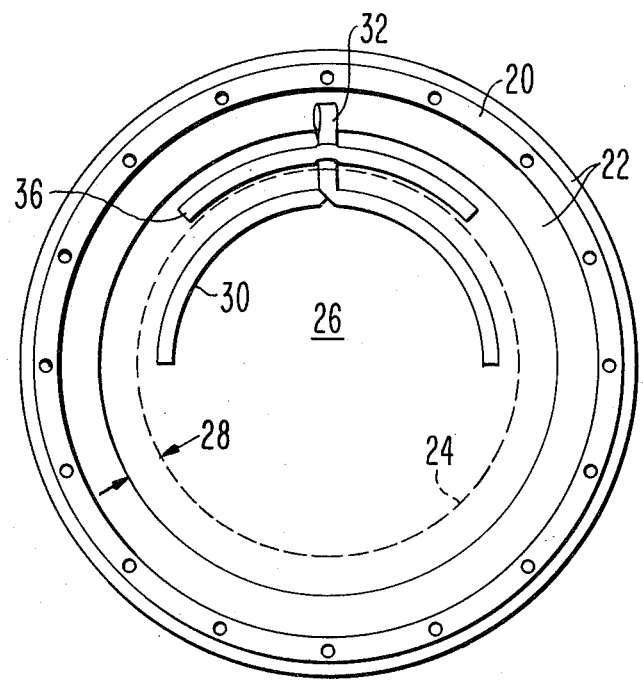
FIG. 2 is a plan view showing the deflation port in greater detail.

FIG. 2, 3 and 4 show the construction of the deflation port in greater detail. The hull fabric 16 is provided with a circular opening, the edge of which is permanently clamped by a rigid frame 18 made of a material such as aluminum, as shown in the sectional view of FIG. 4. A deflation port as shown in FIG. 2 includes a rigid clamping hoop 20 of aluminum provided with bolt holes for fastening the deflation port 12 to the hull frame 18. A ring 22 of flexible sheet material has its peripheral edge cemented by an adhesive material to the hoop 20 and clamped between the hull frame 18 and the hoop 20 by means of bolts (not shown). The flexible sheet ring 22, having an inner edge 24, may be made of a polyester cloth coated with polyurethane on the outside and a thin layer of oriented non-woven cloth on the inside. However, any cementable fabric normally used for balloon or airship hulls is suitable.

A flexible sheet disc 26, which may be made of the same material as the ring 22, is larger in size than the hole 24 in the ring 22 so that it overlaps the ring a radial amount 28. The overlapped portion of the ring 22 and disc 26 are cemented together by means of an adhesive such as the Type UR-1087 two-part fabric cement manufactured by Shore Chemical Company. The weave (or yarn direction) of the disc fabric is oriented at ±45 degrees from the vertical to minimize any tendency to rip in the vertical direction.

But, before the disc 26 is cemented over the hole in ring 22, a main deflation tape 30 is cemented and sewed to the disc 26 in an arc in the top half of the disc 26. The central part of the main tape 30 is extended radially and formed into a loop 32 adapted to be secured to the lanyard 14 shown in FIG. 1. Stitch-backing fabric or tape consisting of two 90-degree arcuate portions 34 and 34' are cemented to the back side of the disc 26 opposite the main tape 30, so that the stitches go through the three layers 30, 26 and 34 (or 34') of fabric. The weave of the stitch-backing fabric is also oriented at 45 degrees to the vertical. A reenforcing or starter tape 36 is also cemented and stitched to the disc 26 over an arc of about 90 degrees. The starter tape 36 is stitched over the radial extension of the main tape 30 so that a pull on the loop 32 of the main tape 30 acts first on the starter tape 36 and the top edge of the disc 26 to which the starter tape 36 is sewed. The starter tape 36 reenforces the fabric at the top of the disc 26, and prevents a tearing of the fabric. Tapes 30 and 36 may be 1-inch wide natural double-herringbone twist Nylon web tape having a break strength of 3300 pounds.

After the main tape 30, the stitch-backing tape 34, and the starter tape 36 are cemented and stitched to the disc 26, the portion 28 of the disc which overlaps the ring 22 is cemented to the ring. Then, segments 38 which may be of the same material as ring 22 are cemented over the joint between the peripheral edge of the disc 26 and the surface of the ring 22. And similarly, on the other side, wider segments 40 of a similar material are cemented over the joints between the ring 22, and the stitch-backing tape 34, and the disc 26. Individual segments 38 and 40 are used instead of 360-degree continuous rings in order to conserve material and favorably orient the weave in the same direction in each segment.

The cementing of the area of overlap 28 of the ring 22 and disc 26, and the cementing of the segments 38 and 40, are performed in a standardized fashion which insures that a downward force of between 50 and 150 pounds to the loop 32 in the main tape 30 will peel the cemented disc 26 from the ring 22 and uncover the hole in the ring.

The invention may be used to prevent the loss of a balloon or airship, and its payload, in the event that the balloon or airship breaks free of its tether or mooring in high winds. In this case, the upper end of the lanyard 14 attached to the loop 32 of the main deflation tape 30, and the lower end of the lanyard is independently fastened to the ground or the mooring tackle with slack in the lanyard. When the balloon or airship breaks loose, the lanyard pulls the disc 26 away from the ring 22, the gas in the hull escapes through the opening in the ring 22, and the balloon or airship settles safely to earth. Two deflation ports may be employed, one on each side of the airship.

After the disc 22 has been peeled from the ring 22, the hull may be prepared for re-inflation by merely removing the bolt-held assembly shown in FIG. 2 from the frame 18 on the airship hull, and bolting a spare assembly to the frame. There is no need to perform cementing operations at the site of the deflated balloon or airship.

The deflation port is preferably circular as shown, but non-circular constructions may be employed if desired.

What is claimed is:

1. A balloon, comprising:
   an envelope of flexible material and a deflation opening in the envelope,
   a rigid frame permanently fastened to the edge of the opening in the envelope,
   a ring of flexible sheet material having its peripheral edge removably clamped to said rigid frame, and having a central opening,
   a disc of flexible sheet material larger than said central opening and fastened by an adhesive to the outside of the ring all around said central opening in the ring,
   a deflation tape fastened to said disc near the edge of the upper half thereof, and having a central free end to be pulled from the exterior of the balloon for peeling the adhesive-held disc off from the outside of the ring to thereby uncover the central opening in the ring and deflate the balloon, and
   segments of flexible material fastened by adhesive to bridge an edge of an overlap joint between said ring and said disc.

2. A balloon as defined in claim 1 wherein said deflation tape is fastened by sewn stitches.

3. A balloon as defined in claim 1, and in addition, a reenforcing tape segment fastened to the free end of the deflation tape and fastened to said disc nearer the upper edge thereof than said deflation tape to prevent a tearing of said disc.

4. A balloon as defined in claim 3 wherein said tapes are fastened by sewn stitches.

5. A balloon as defined in claim 1 in which said segments of flexible material are fastened by an adhesive to bridge the joint between the peripheral edge of the disc and the adjacent outside surface of the ring.

6. A balloon as defined in claim 5 in which said segments of flexible material include segments fastened by an adhesive to bridge the joint between the edge of the central opening in the ring and the inside surface of the disc.

7. A balloon as defined in claim 6 and, in addition, a stitch-backing tape on the opposite side of the disc from the deflation tape.

8. A balloon as defined in claim 1 in which said segments of flexible material are fastened by an adhesive to bridge the joint between the edge of the central opening in the ring and the inside surface of the disc.

9. For use on a balloon having an envelope of a flexible material and having a deflation port opening therein for permitting escape of the gas in the balloon when the port is opened, and improved construction for the deflation port comprising:
   a rigid frame permanently fastened to the edge of the opening in the envelope,
   a ring of flexible sheet material having its peripheral edge removably clamped to said rigid frame, and having a central opening,
   a disc of flexible sheet material larger than said central opening and fastened by an adhesive to the outside of the ring all around said central opening in the ring,
   a deflation tape fastened to said disc near the edge of the upper half thereof, and having a central free end to be pulled from the exterior of the balloon for peeling the adhesive-held disc off from the outside of the ring to thereby uncover the central opening in the ring and deflate the balloon, and
   segments of flexible material fastened by adhesive to bridge an edge of an overlap joint between said ring and said disc.

* * * * *